UNITED STATES PATENT OFFICE.

W. D. MONK, OF WILLIAMSBURG, NEW YORK.

IMPROVEMENT IN CURING HEMP, FLAX, &c.

Specification forming part of Letters Patent No. 59,436, dated November 6, 1866.

*To all whom it may concern:*

Be it known that I, WILLIAM D. MONK, of Williamsburg, Kings county, State of New York, have invented a new and useful Improvement in Curing Hemp, Flax, &c.; and I do hereby declare that the following is a full, clear, and exact description thereof, which will enable others skilled in the art to make and use the same.

The object of this invention is to remove from the fibers of hemp, flax, and other similar plants all gum and glutinous matter adhering to the same, and to bring said fibers in such a state that they are fit for spinning without requiring any further preparation.

In carrying out my invention I cut the hemp or other plant and dry the same in the ordinary manner. After the plant has been dried I put the same in vats filled with Javelle's water, which consists of a solution of a compound of chloride of lime and soda in water, about two-thirds of chloride of lime to one-third of soda being used, though this proportion may be changed to suit the plant. The strength of the solution depends upon the plant to be acted on, but as a general rule a solution of two pounds of choride of lime and one pound of soda in three gallons of water will be of sufficient strength for most fibrous plants to be treated. In this solution I place the hemp or other plant for about twenty-four hours. Then I remove the same from the liquid and pass it through grooved rollers. By the action of the rollers the shank is smashed, and finally the fibers are freed from the impurities by shaking and beating.

By the action of the Javelle's water the gum and glutinous matters adhering to the fibers are dissolved, and the fibers are brought in the proper condition for spinning.

I claim as new and desire to secure by Letters Patent—

The within-described process of curing hemp, flax, and other fibrous plants by exposing them to the action of Javelle's water, substantially as set forth.

The above specification of my invention signed by me this 19th day of July, 1866.

W. D. MONK.

Witnesses:
 W. HAUFF,
 ALEX. F. ROBERTS.